(12) United States Patent
Estevez et al.

(10) Patent No.: US 10,999,414 B2
(45) Date of Patent: May 4, 2021

(54) GENERATION OF A MEDIA PROFILE

(71) Applicant: Texas Instruments Incorporated, Dallas, TX (US)

(72) Inventors: Leonardo William Estevez, Rowlett, TX (US); Benzy Gabay, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/817,020

(22) Filed: Aug. 3, 2015

(65) Prior Publication Data

US 2016/0191674 A1 Jun. 30, 2016

Related U.S. Application Data

(63) Continuation of application No. 12/533,559, filed on Jul. 31, 2009, now abandoned.

(51) Int. Cl.
| | |
|---|---|
| *H04L 29/06* | (2006.01) |
| *G06F 16/435* | (2019.01) |
| *H04L 29/08* | (2006.01) |
| *G06Q 50/18* | (2012.01) |
| *G06Q 30/02* | (2012.01) |
| *G06F 21/10* | (2013.01) |

(52) U.S. Cl.
CPC ............ *H04L 67/42* (2013.01); *G06F 16/437* (2019.01); *G06F 21/10* (2013.01); *G06Q 30/02* (2013.01); *G06Q 50/184* (2013.01); *H04L 67/22* (2013.01); *H04L 67/306* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,356,761 | B1 | 3/2002 | Huttunen et al. |
| 6,385,596 | B1 | 5/2002 | Wiser et al. |
| 7,035,871 | B2 | 4/2006 | Hunt et al. |
| 7,080,160 | B2 | 7/2006 | Cognet et al. |
| 7,765,245 | B2 | 7/2010 | Nichols et al. |
| 2004/0220926 | A1* | 11/2004 | Lamkin ............. G06F 17/30017 |
| 2006/0159109 | A1* | 7/2006 | Lamkin ............. G06F 17/30174 370/401 |

(Continued)

OTHER PUBLICATIONS

FAT Folder Structure date unknown [captured on Jan. 30, 2017], ntfs.com, http://www.ntfs.com/fat-folder-structure.htm.*

(Continued)

*Primary Examiner* — Jason G Liao
(74) *Attorney, Agent, or Firm* — Brian D. Graham; Charles A. Brill; Frank D. Cimino

(57) ABSTRACT

One aspect of the invention includes a computer device. The computer device includes a network interface component configured to download media from an external source through a secure network connection. The computer device also includes a memory configured to store the downloaded content. The computer device further includes a media profiling engine configured to query the memory for the downloaded content based on the connection of the network interface component to the external source through the secure network connection and to generate a media profile log comprising information relevant to the downloaded content.

11 Claims, 4 Drawing Sheets

(56) References Cited

U.S. PATENT DOCUMENTS

| | | | |
|---|---|---|---|
| 2007/0162581 A1* | 7/2007 | Maes | H04L 29/12047 709/223 |
| 2007/0198739 A1 | 8/2007 | Jennings et al. | |
| 2007/0233740 A1* | 10/2007 | Nichols | G06F 17/30038 |
| 2008/0183760 A1 | 7/2008 | Spring et al. | |
| 2008/0215490 A1 | 9/2008 | Howard et al. | |
| 2008/0294277 A1 | 11/2008 | Hicken et al. | |
| 2009/0164287 A1 | 6/2009 | Kies et al. | |
| 2010/0015975 A1* | 1/2010 | Issa | H04L 63/102 455/435.1 |

OTHER PUBLICATIONS

Windows—DOS Commands date unknown [captured on Jan. 30, 2017], kb.wisc.edu, https://kb.wisc.edu/page.php?id=903].*
Gamberg, Understanding Your Modem Log date unknown [captured on Jan. 30, 2017], modemsite.com, http://www.modemsite.com/56k/modemlog.asp.*
Davies, Log4j Best Practices Jun. 9, 2008, http://juliusdavies.ca/, http://juliusdavies.ca/logging.html.*
Jacobson et al., TCP Extentions for High Performance May 1992, IETF, RFC 1323, https://tools.ietf.org/html/rfc1323.*
MBu et al., Search by date using command line Feb. 21, 2012 9:27, stackoverflow.com, http://stackoverflow.com/questions/9234207/search-by-date-using-command-line.*
Sheppard, For /f—Loop through text date unknown [captured by archive.org on Jul. 29, 2008], ss64.com, http://web.archive.org/web/20080729061719/http://www.ss64.com/nt/for_f.html.*
Freier et al., The SSL Protocol Version 3.0 Nov. 18, 1996 [captured by archive.org on Aug. 15, 2000], netscape.com, http://web.archive.org/web/20000815062743/http://home.netscape.com/eng/ssl3/draft302.txt.*
Dell Latitude D600 2003, Dell Inc, http://www.dell.com/downloads/global/products/latit/en/spec_latit_d600_en.pdf.*
Starfield Technologies—Frequently Asked Questions, date unknown [captured by archive.org on Sep. 3, 2004], Starfield Technologies, https://web.archive.org/web/20040903011104/https://products.secureserver.net/products/faq_secureturbo.htm (Year: 2004).*
Dir, date unknown [captured by archive.org on Jan. 4, 2008], Microsoft, https://web.archive.org/web/20080104235758/https://www.microsoft.com/resources/documentation/windows/xp/all/proddocs/en-us/dir.mspx?mfr=true (Year: 2008).*
Dusty, Batch to find files with todays date time stamp, Dec. 31, 2008, computerhome.com, https://www.computerhope.com/forum/index.php?topic=73407.0 (Year: 2008).*
Troubleshooting Windows Firewall settings in Windows XP Service Pack 2, date unknown [captured by archive.org on Aug. 10, 2004], Microsoft, https://web.archive.org/web/20040810130301/http://support.microsoft.com/default.aspx?kbid=875357 (Year: 2004).*
US Copyright Office Report on Legal Protection for Databases Aug. 1997, US Copyright Office https://www.copyright.gov/reports/db4.pdf.*

* cited by examiner

| | PROFILE LOG | | | |
|---|---|---|---|---|
| | FILE NAMES/ EXTENSIONS (102) | FILE SIZE (104) | SOURCE IP ADDRESS (106) | DOWNLOAD/ ACCESS TIMES (108) |
| 70 | FILE_A.XXX | X BYTES | NNN.XX.YYY.ZZZ | DD/MM/YYYY H:M:S |
| | FILE_B.YYY | Y BYTES | NNN.XX.YYY.ZZZ | DD/MM/YYYY H:M:S |
| | FILE_C.ZZZ | Z BYTES | NNN.XX.YYY.ZZZ | DD/MM/YYYY H:M:S |
| | FILE_D.XXX | XX BYTES | NNN.XX.YYY.ZZZ | DD/MM/YYYY H:M:S |
| | FILE_E.ZZZ | YY BYTES | NNN.XX.YYY.ZZZ | DD/MM/YYYY H:M:S |
| | FILE_F.YYY | ZZ BYTES | NNN.XX.YYY.ZZZ | DD/MM/YYYY H:M:S |

FIG. 3

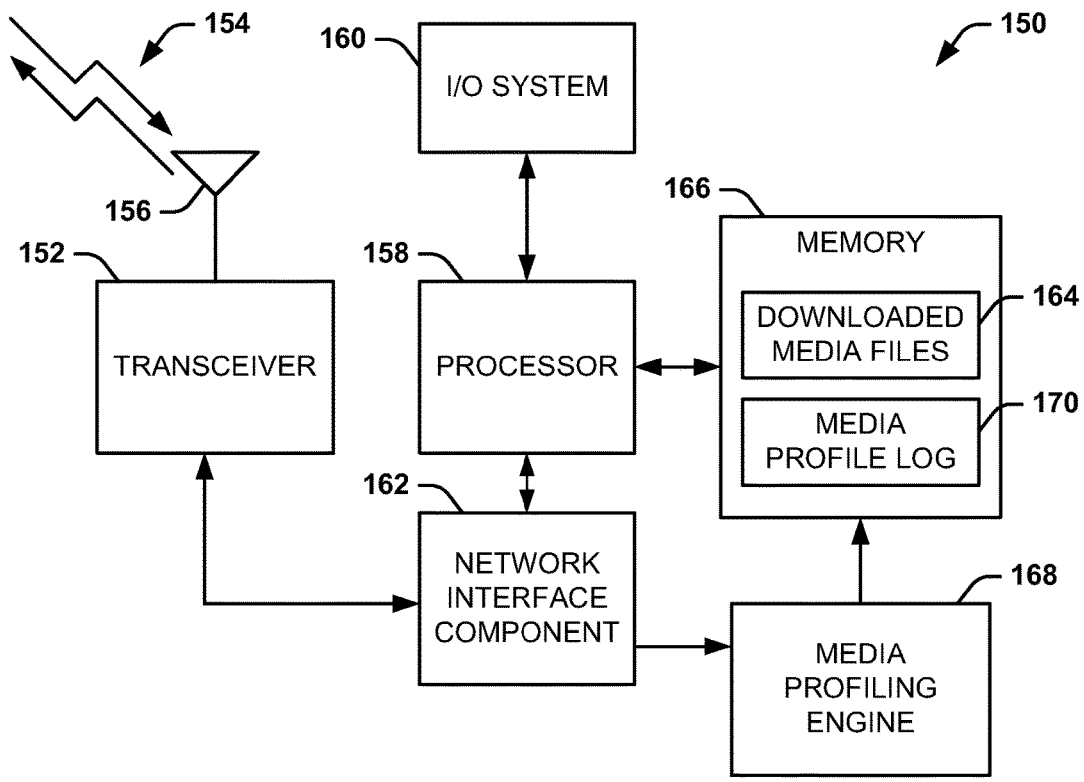

FIG. 4

GENERATION OF A MEDIA PROFILE

CROSS-REFERENCE TO RELATED APPLICATIONS

This application is a continuation of U.S. Nonprovisional application Ser. No. 12/533,559, filed Jul. 31, 2009, which is hereby incorporated by reference for all purposes.

TECHNICAL FIELD

This invention relates to generation of a media profile.

BACKGROUND

In digital commerce, consumers can access specific websites on the Internet to purchase goods and/or services via the specific websites. Consumers are often tracked in digital commerce for purposes of advertisement that is directed to the consumer, such as based on a transaction history of the respective consumer with respect to previously visited websites and/or previous purchases from a given online media provider. For example, client cookies and/or reports are often provided to a push server that is coupled to the Internet for directing targeted advertisement to the client based on the client's apparent preferences in response to the transaction history.

SUMMARY

One aspect of the invention includes a computer device. The computer device includes a network interface component configured to download media from an external source through a secure network connection. The computer device also includes a memory configured to store the downloaded content. The computer device further includes a media profiling engine configured to query the memory for the downloaded content based on the connection of the network interface component to the external source through the secure network connection and to generate a media profile log comprising information relevant to the downloaded content.

Another embodiment of the invention includes a portable electronic device. The portable electronic device includes a transceiver configured to transmit and receive wireless signals via an antenna and a network interface component configured to wirelessly communicate data to and from an external source through a secure network connection via the transceiver. The portable electronic device also includes a memory configured to store a content file corresponding to the downloaded content and a media profiling engine configured to query the memory for the content file based on a file creation time of the content file stored in the memory relative to a time of a connection of the network interface component to the external source via the secure network connection, the media profiling engine updating a media profile log with information relating to the content file stored in the memory.

Another embodiment of the invention includes a method for generating a media profile on a computer device. The method includes establishing a secure network connection between the computer device and an external source associated with at least one of a purchase and retrieval of media content. The method also includes downloading the media content purchased from the external source and storing the media content as a media file in local memory of the computer device. The method also includes querying the memory for the media file based on at least one condition associated with the secure network connection of the computer device and the external source. The method further includes updating a media profile log in the computer device with information relevant to the media content purchased from the external source.

BRIEF DESCRIPTION OF THE DRAWINGS

FIG. 3 illustrates an example of a media profile log in accordance with an aspect of the invention.

FIG. 4 illustrates an example of a portable electronic device that can generate a media profile in accordance with an aspect of the invention.

DETAILED DESCRIPTION

The invention relates to network communications and, more specifically, to generation of a media profile. A computer device, such as a portable electronic device (e.g., wireless phone or laptop computer), can be used to download media from an external source through a secure network connection. A media profiling engine can query memory for the downloaded content and generate a media profile that is stored on the computer device. The media profile can include information such as file names, file extensions, file sizes, the IP addresses of the external sources, and/or the times the respective media files were downloaded.

As an example, the media profiling engine can include a secured connection monitor that is configured to detect when the computer device is connected to an external source via the secure network connection. For instance, a file query engine can search for a downloaded file based on the secured connection monitor detecting the secure network connection. The file query engine can also ascertain a start time and an end time of the secure network connection. The file creation timestamps of stored files can be compared with the start and end times of the secured connection to determine which file(s) were downloaded during the secure network connection.

Because the media files that are searched in the memory result from connections to an external source via a secure network connection, the respective media files likely correspond to purchased media. Accordingly, information associated with such downloads can be added to the media profile on the computer device. As a result, the information in the media profile can be implemented for a variety of purposes, such as targeted advertisement or as confirmation of a successful download of the associated media. Since the media profile is generated and maintained on the computer device, as opposed to an external server, the client's personal information can be better isolated to provide a greater degree of privacy to the client. Furthermore, because the profile is not linked to an IP address of the computer device, but is instead resident on the computer device, push traffic can be maintained for the computer device that is configured as a portable electronic device, even when the device's IP address changes when encountering a new DHCP server.

Figure 1:
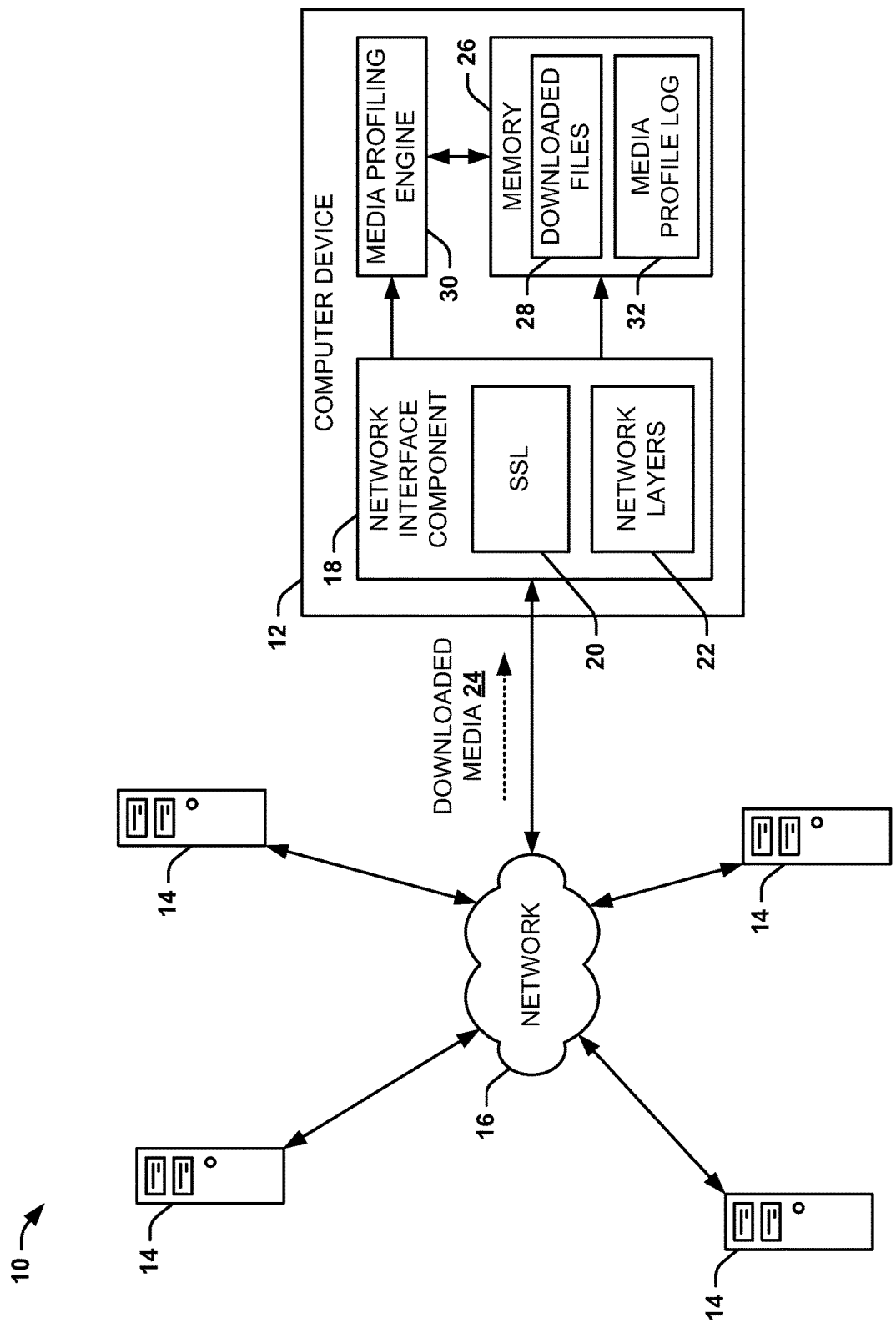
FIG. 1 illustrates an example of a network system in accordance with an aspect of the invention.

FIG. 1 illustrates an example of a network system 10 that can be utilized to generate a media profile for a computer device 12 in accordance with an aspect of the invention. The network system 10 can include any number of one or more servers 14 that are in communication with a network 16, such as can include the Internet. The computer device 12 can be any of a variety of devices that is configured to communicate via the network 16. As an example, the computer device 12 can be a generally fixed computing device, such as a desktop computer, set top box or other Internet ready appliance. Alternatively, the computer device 12 can be a mobile device, such as a laptop computer, a personal digital assistant (PDA), or a wireless communication device.

The computer device 12 includes a network interface component 18 that is configured to access the network 16. In the example of FIG. 1, the network interface component 18 can be representative of a variety of hardware and/or software components configured to communicate with the network 16, such as by employing corresponding network communication protocols. The network interface component 18 includes a secured socket layer (SSL) 20 and network layers 22. The SSL 20 enables the network interface component 18 to establish a secure network connection via the network 16 with external devices, such as the servers 14. As an example, the network layers 22 can be implemented according to one or more of the Open Systems Interconnection Reference Model (OSI Model), such as the Internet Protocol Suite (e.g., TCP/IP) or according to other network architectures. The network layers 22 can also employ one or more Operating System (OS) Abstraction layers, and/or a wireless local area network (WLAN) or other hardware and software to facilitate data delivery. That is, the network layers 22 provide the interface between the physical media and the software required to provide for end-to-end delivery of data between the device 12 and an external source, such as the servers 14.

The network interface component 18 can be implemented to download content 24, such as from a resource location at one or more of the servers 14 via the network 16. The computer device 12 stores the externally downloaded content 24 in a memory 26 as one or more downloaded content files 28. The network interface component 18 can implement the SSL 20 to establish a secure network connection between the computer device 12 and the respective one of the servers 14. As an example, the servers 14 can be representative of respective online vendors that are configured to sell digital media online via the network 16. The externally downloaded content 24 can include one or more software files that are purchased from the respective one of the servers 14. As used herein, media can include but is not limited to audio and/or video files, streaming audio and/or video, ringtones, executable applications or other type of content that is available for purchase and download. The downloaded content 24 can also include transaction related data, such as online receipts resulting from the purchase of goods that are purchased from a respective one of the servers 14.

The computer device 12 also includes a media profiling engine 30 configured to query the memory 26 for the downloaded content files 28 and to generate/update a media profile log 32 based on information associated with the downloaded content files 28. The media profiling engine 30 can be configured as a dedicated media profiling daemon or as part of a local proxy server. As an example, the network interface component 18 can provide time information indicative of the time that the network interface component 18 was connected to the external source via the secure network connection to the media profiling engine 30. As an example, the time information corresponds to a timestamp that includes a start time and an end time of the secure network connection. The time can be global or regional time or it can be an internal time maintained by the computer device 12. The media profiling engine 30 can search the memory 26 for the downloaded content files 28 based on timestamps of the downloaded content files 28 occurring within the time duration that is between the start time and the end time.

As another example, the media profiling engine 30 can receive an input from the network interface component 18 that corresponds to a current secure network connection. The input can operate to trigger the media profiling engine 30 to ascertain the file name of the newly created file. For instance, a file creation engine (not shown) can create a new file for storing the downloaded content, which storage can be detected and operate to trigger the media profiling engine 30 to determine characteristics of the downloaded file.

The media profile log 32 can include a set of information associated with each of the downloaded content files 28 that are obtained via the secure network connection. The information about the downloaded content files 28 in the media profile log 32 can store information about any number of one or more different transactions. The media profile log 32 thus can represent cumulative information from multiple downloads at the computer device 12 from respective separate secure network connections. The media profile log 32, however, does not need to store any personal information. As an example, the media profile log 32 can include information about each downloaded file obtained via a secure network connection. The information can include, for example, the file name(s), file extension(s), file size, the IP addresses of the external sources from which the downloaded content files 28 were obtained, metadata (data about the downloaded data) and/or time information. The time information can include descriptors that identify when the respective content files 28 were downloaded and/or when the file was created, or when and/or how often the file is subsequently accessed by a user of the computer device 10.

Because the downloaded content files 28 result from connections to the external sources via secure network connections, the downloaded content files 28 can be assumed to be purchased media. As a result, the information in the media profile log 32 can be implemented for a variety of purposes, such as targeted advertisement and/or partial monetization of the transactions. In addition, the media profile log 32 can be implemented for confirmation to media vendors that a purchased media file was successfully downloaded and/or accessed, or to alert the media vendor that the purchased media file was potentially illegally redistributed. Also, since the media profile log 32 is generated and maintained on the computer device 12, as opposed to an external server, the personal information of the client can be better isolated to provide a greater degree of privacy to the client. Furthermore, because the profile is not linked to an IP address of the computer device 12, but is instead resident on the computer device 12, push traffic can be maintained for the computer device 12 that is configured as a portable electronic device, even when the IP address of the computer device 12 changes when encountering a new DHCP server.

It is to be understood that the computer device 12 is not limited to the example of FIG. 1. As an example, the computer device 12 can include several memory modules, such that the downloaded content files 28 and the media profile log 32 can be stored in separate memory modules. Additionally or alternatively, the media profiling engine 30 may monitor or otherwise utilize a connectivity/network subsystem (whether secure or not). The connectivity/network subsystem (or media profiling engine) could trigger a scan of securely transferred files to determine and log the name of files concurrently accessed along with any identifier associated with the connectivity/network session (such as a WLAN or BT MAC ID address). Alternatively, connectivity subsystem use times and MAC IDs may be logged and later when a periodic file scan takes place, the log may be updated with filenames of files accessed around the same time. Thus, it will be appreciated that the computer device 12 can be configured in any of a variety of ways.

Figure 2:
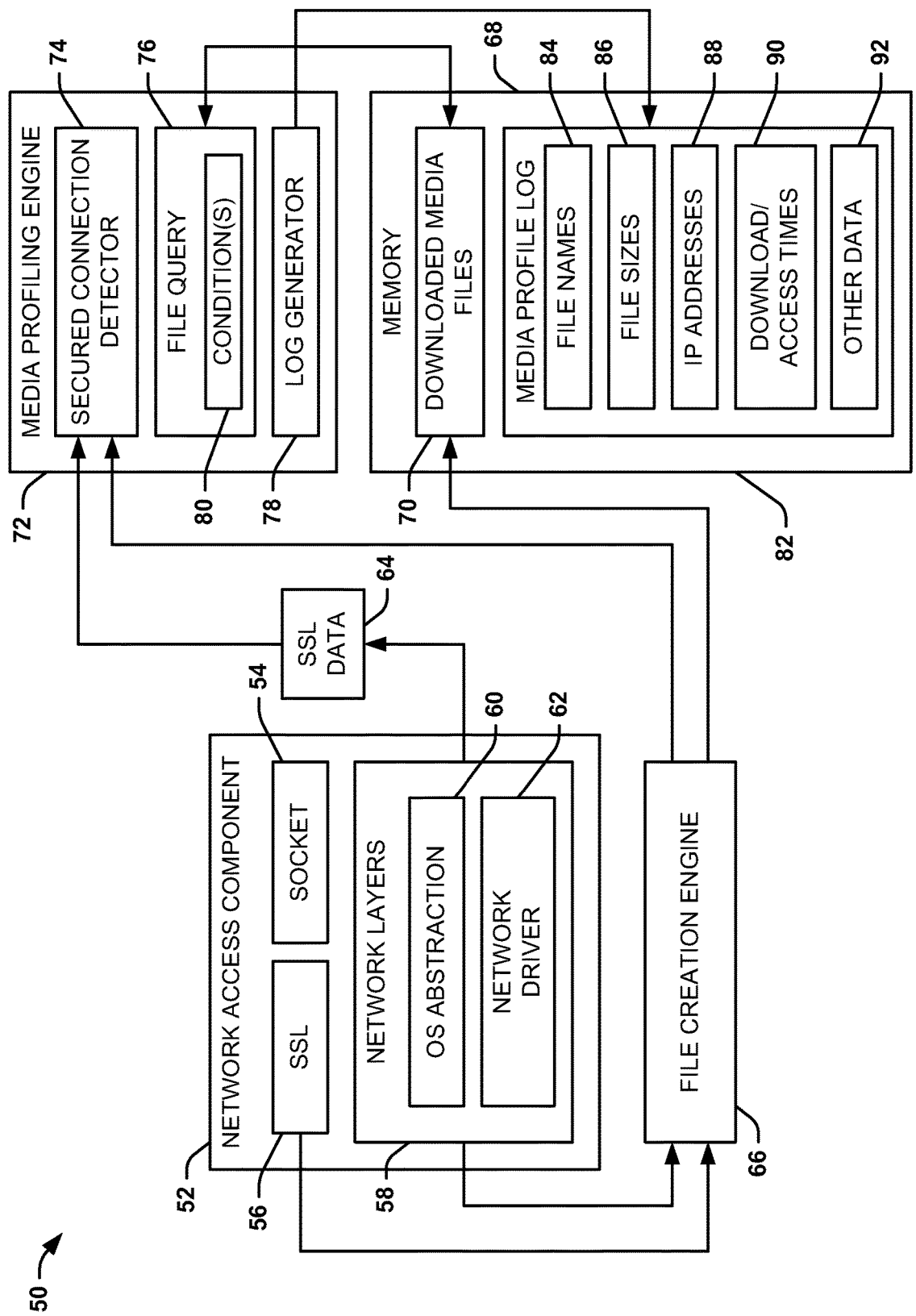
FIG. 2 illustrates an example of a computer device in accordance with an aspect of the invention.

FIG. 2 illustrates another example of a computer device 50 in accordance with an aspect of the invention. Similar to as described above, the computer device 12 can be any of a variety of devices that are configured to interface with the Internet, such as a desktop or laptop computer, a set top box, network appliance, or a wireless communication device.

The computer device 50 includes a network interface component 52 that is configured to access the Internet. In the example of FIG. 2, the network interface component 52 can be representative of a variety of hardware and/or software components that communicate with the network, such as wirelessly. The network interface component 52 includes a socket 54 and an SSL 56. The socket 56 provides a data port for the computer device 50 for receiving data from external devices, such as the servers 14 in the example of FIG. 1, over the Internet. The SSL 56 enables the network interface component 52 to establish a secure network connection with the external devices over the Internet, such as based on any of a variety of encryption methods. As a result, sensitive information can be transmitted between the computer device 50 and the external devices, such as bank account and/or credit card numbers. Therefore, the computer device 50 can establish a secured connection to one or more external devices to purchase media.

The computer device 50 also includes network layers 58, which can be configured as any of a variety of network system models, such as the OSI model, TCP/IP, or IPv6. The network layers 58 is demonstrated in the example of FIG. 2 as including one or more OS Abstraction layers 60 and a network driver 62. The OS Abstraction layer(s) 60 can be configured as an application programming interface (API) to an associated operating system of the computer device 50 for any of one or more of the network layers 58. The network driver 62 can be a software driver that acts as an interface between the software of the computer device 50 and an associated network access hardware component (not shown), such as a wireless network card. The network layers can be utilized to acquire information about when a file is downloaded via a secure network connection.

By way of example, the network interface component 52 can be utilized for a network connection implemented to purchase and download purchased media via a secured connection from external sources on the Internet. When the purchase and/or download of the media is initiated, the network interface component or other associated process can invoke the SSL 56 to establish the secured connection to the external source having a resource locator (e.g., a uniform resource locator (URL)) for the downloaded content. In response, one or more of the network layers 58, such as the one or more of the OS Abstraction layers 60 or the network driver 62, can generate SSL data 64 to indicate the secure network connection. As an example, the SSL data 64 can include an indicator that the SSL 56 has been instantiated to establish the secured connection or can include both a start time and an end time of the secured connection.

The computer device 50 includes a file creation engine 66 and a memory 68. The file creation engine 66 is configured to generate one or more files corresponding to the downloaded purchased media, such as in response to commands from the SSL 56 and/or one or more of the network layers 58. As an example, the file creation engine 66 can be software associated with the operating system of the computer device 50 to create files from the data associated with the downloaded purchased media that is received via the SSL 56 and/or the network layers 58, such as an application layer (not shown). The file creation engine 66 generates the files in the memory 68, with the files associated with the downloaded content being demonstrated in the example of FIG. 2 as downloaded content files 70.

The computer device 50 also includes a media profiling engine 72 that is configured to query the memory for the downloaded file and to generate a corresponding media log. As an example, the media profiling engine 72 can be configured as an isolated co-processor, such as a dedicated media profiling daemon or as part of a local proxy server. In the example of the media profiling engine 72 being configured as a dedicated media profiling daemon, the SSL data 64 can be provided responsive to SSL sensing in the network driver 62 and/or detecting an associated IP stack of the network layers 58. In the example of the media profiling engine 72 being configured as or as part of a local proxy server, the SSL data 64 can be provided from one or more of the OS Abstraction layers at various levels of the network layers 58 according to the network architecture and corresponding protocol.

In the example of FIG. 2, the media profiling engine 72 includes a secured connection detector 74, a file query engine 76, and a log generator 78. The SSL data 64 is provided to the secured connection detector 74. In response, the secured connection detector 74 can command the file query engine 76 to query the memory 68 for the downloaded content files 70 based on detecting one or more predetermined conditions 80 pertaining to the secure network connection used to access the downloaded content. For instance, the conditions can include detecting a secure network connection, such as is utilized to purchase and/or download the content. Other conditions can also be utilized, such as storing a file having a size exceeding a predetermined file size or detecting other data that can indicate that media was purchased and/or downloaded. Additionally, the file creation engine 66 can be configured to provide an indication to the secured connection detector 74 that one or more files are being created as the downloaded content files 70. As a result, the secured connection detector 74 can command the file query engine 76 to query the memory 68 for the downloaded content files 70 based on the one or more conditions 80.

As described above, the SSL data 64 can include time information indicative of the time that the network interface component 52 was connected to the external source via the secure network connection, such as can include a start time and an end time of the secure network connection. Thus, the one or more conditions 80 can correspond to a time or time window that is compared to a creation time stamp when the downloaded content files 70 were stored in memory. If the file has a creation timestamp that approximates the connection time as provided by the SSL data 64, the condition is satisfied. Accordingly, upon the secured connection detector 74 detecting the conclusion of the secured connection, the file query engine 76 could be commanded to search the memory 68 for the downloaded content files 70 that were created within or near the time specified by these creation timestamp conditions 80.

Alternatively, as also described above, the SSL data 64 can provide an indication to the secured connection detector 74 that a secured connection has been requested. Therefore, the one or more conditions 80 can include files that have a creation timestamp subsequent to the secured connection. Accordingly, the file query engine 76 could be commanded to search the memory 68 during the secure connection for the downloaded content files 70 based on the creation timestamps that are subsequent to the secured connection request. In either situation, the creation of the downloaded files 70 by the file creation engine 66 can also be included as one of the conditions 80.

The log generator 78 can be configured to create and/or update a media profile log 82 that is stored in the memory 68. The media profile log 82 can include a set of information associated with each of the downloaded content files 70 that are obtained via the secure network connection. In the example of FIG. 2, the media profile log 82 includes file names 84, file sizes 86, IP addresses 88 that correspond to the sources of the downloaded content files 70, and download/access times 90 that correspond to timestamps of the downloaded content files 70, such as when the downloaded content files 70 were downloaded and when and/or how often the downloaded content files 70 were accessed by a user on the computer device 50. As an example, the media profiling engine 72 can be configured to periodically scan the downloaded media files 70 in the memory 62 to determine when they were last accessed and can update the download/access times 90 with a time of last access and/or can increment a counter that is indicative of a number of times that the downloaded media files 70 are accessed. Thus, the media profile log 82 can be implemented to provide weighting to a given file or file type for purposes of targeted advertisement. In addition, the access times and frequency of access information in the download/access times 90 can be an indicator that the file was successfully downloaded or can be a useful way of determining whether a file is being accessed for redistribution or rendering (e.g., in a peer-to-peer network environment). The log file can also include other data (e.g., metadata) 92 that describes a characteristic of the downloaded content. As an example, the log generator 78 can initially create the media profile log 82 upon the first purchased media download, and can continue to update or append the media profile log 82 for each subsequent media download (i.e., for subsequent downloaded content files 70).

The media profile log 82 can include a list of any and all purchased media by the client via the computer device 50, as well as a variety of relevant information regarding the downloaded content files 70 that were respectively purchased. The information included in the media profile log 82 can be implemented for a variety of reasons. As an example, the media profiling engine 72 can provide network profile updates and/or push requests to a server via the network interface component 52, such as to trigger relevant and/or timely advertisements to the client. The media profiling engine 72 can also provide acknowledgements to the server that provided the respective purchased downloaded content file 70 to provide information to the vendor that the media was downloaded successfully. Because the media profile log 82 is generated and maintained on the computer device 50, as opposed to an external server, the user's personal information, privacy, and performance/experience need not be compromised. In addition, the generation of the media profile log 82 can be implemented in an OS abstracted manner on the computer device 50 since most network drivers, such as the network driver 62, can include a core and various OS abstractions to accommodate different potential operating systems. Furthermore, because the profile is not linked to an IP address of the computer device, but is instead resident on the computer device, push traffic can be maintained for the computer device 50, even when the IP address of the computer device 50 changes when encountering a new DHCP server, such as for a computer device 50 that is implemented as a mobile electronic device.

It is to be understood that the computer device 50 is not limited to the example of FIG. 2. As an example, the computer device 50 can include several memory modules, such that the downloaded content files 70 and the media profile log 82 can be stored in separate memory modules. In addition, it is to be understood that the components demonstrated in the computer device 50 in the example of FIG. 2 can be implemented as a combination of hardware and software, such that the computer device 50 is demonstrated in the example of FIG. 2 in a more conceptual manner.

FIG. 3 illustrates an example of a media profile log 100 in accordance with an aspect of the invention. The media profile log 100 can correspond to the media profile log 82 in the example of FIG. 2. Therefore, reference may be made to the example of FIG. 2 in the following description of the example of FIG. 3.

The media profile log 100 includes a list of downloaded content files 70. Each of the downloaded content files 70 can include a plurality of fields that characterize downloaded content. In the example of FIG. 3, the log 100 includes a file name field, including extension, demonstrated at 102. The log 100 can also include a size field 104 for the content files in bytes. In addition, the media profile log 100 includes field 106 for the source IP address of each of the downloaded content files 70. The source IP addresses 106 can be the IP addresses or other resource locator for the resource at which the content was downloaded and/or purchased. A timestamp field 108 can also be stored in the log 100 corresponding to the time at which the respective downloaded content files 70 were created in the memory 68. It is to be understood that the media profile log 100 is not limited to including only the fields demonstrated in the example of FIG. 3, but could also include any of a variety of additional details regarding the downloaded content files 70 (e.g., metadata, expiration time or the like) that can be ascertained from querying the memory 68.

FIG. 4 illustrates an example of a portable electronic device 150 in accordance with an aspect of the invention. As an example, the portable electronic device 150 can be configured as a laptop computer or a wireless communications device, such as a smart phone. The portable electronic device 150 includes a transceiver 152 configured to transmit and receive wireless signals, demonstrated at 154, via an antenna 156. The portable electronic device 150 also includes a processor 158 and an input/output (I/O) system 160. The I/O system 160 can be configured to provide an interface for the user of the portable electronic device 150, such as including a touch screen or keypad, a microphone, and a speaker.

The portable electronic device 150 also includes a network interface component 162. As an example, the network interface component 162 can be configured substantially similar to the network interface component 52 in the example of FIG. 2, such as including an SSL, socket, and network layers, and can be thus configured to provide wireless connectivity of the portable electronic device 150 to the Internet or other network. Therefore, the user of the portable electronic device 150 can navigate the Internet via the I/O system 160 and purchase media from any of a variety of online vendors. Upon establishing a secure network connection via the network interface component 162, the network interface component 162 can retrieve downloaded content files 164 that are stored in memory 166.

The portable electronic device 150 could further include a media profiling engine 168. As an example, the media profiling engine 168 can be configured substantially similar to the media profiling engine 72 in the example of FIG. 2. For instance, the media profiling engine 72 can be configured to query the memory 166 for the downloaded content files 164 and to generate a media profile log 170 associated with the downloaded content files 164. As an example, the media profile log 170 can include file names, file sizes, source IP addresses, and download and/or access timestamps, similar to as described above in the example of FIG. 3. As a result, the portable electronic device 150 can maintain the media profile log 170 on the device itself, as opposed to an external server, and can provide wireless network profile updates and/or push requests to an external server while maintaining client privacy for the user.

Figure 5:
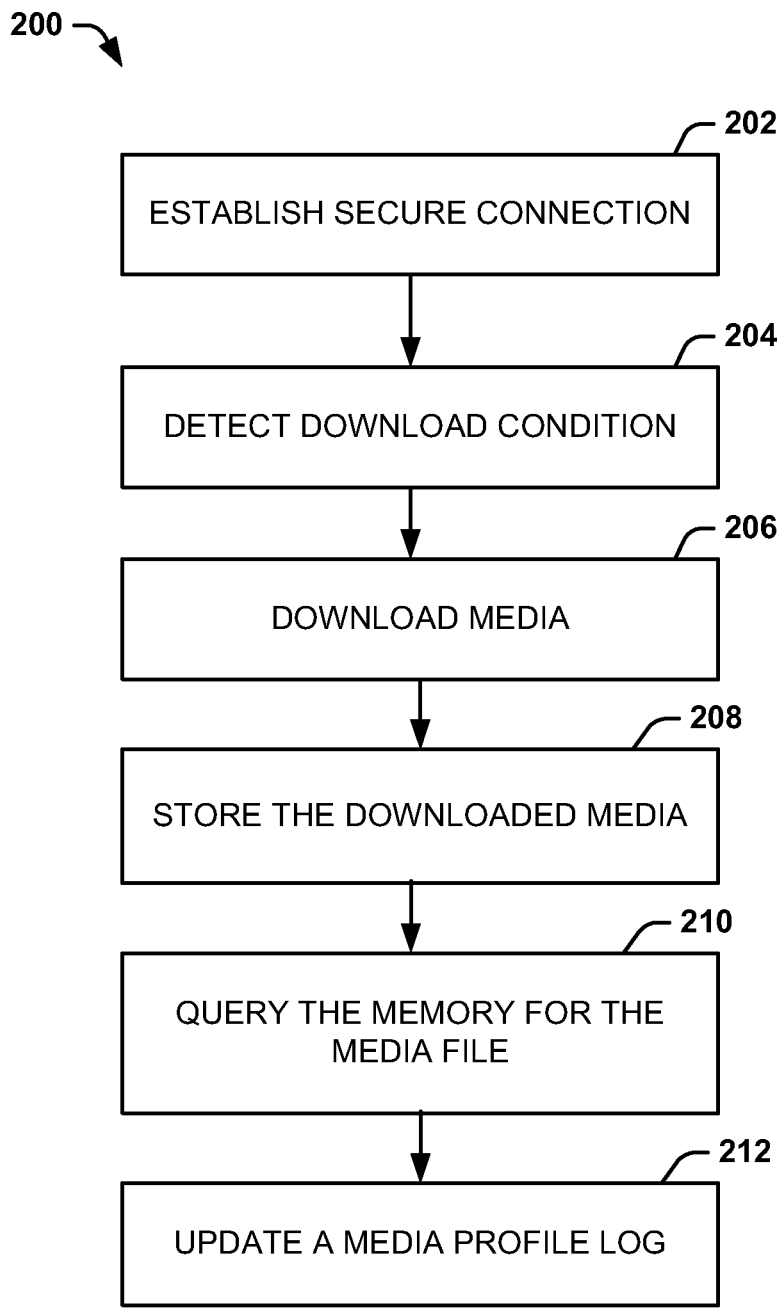
FIG. 5 illustrates an example of a method for generating a media profile on a computer device in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., analog or digital circuitry, such as may be embodied in an application specific integrated circuit), software (e.g., as executable instructions stored in memory or running on one or more computer systems or a processor), or any combination of hardware and software.

FIG. 5 illustrates an example of a method 200 for generating a media profile on a computer device in accordance with an aspect of the invention. The method begins at 202 in which a secure network connection is established. The secure network connection can be based on instantiating an SSL, and the external source can be any of a variety of Internet vendors. The secure connection can be initiated by a user or automatically by the device in connection with a purchase or other transaction for media. At 204, a download condition is detected. The download condition, for example, can correspond to detecting a secure network connection invoked to enable a secure transaction and/or download of content as described herein.

At 206, media is downloaded from an external source, which may be through the secure network connection established at 202. Alternatively, the secure connection at 202 can be employed to purchase the media and another secure or non-secure connection can be employed to download the content at 206. The media can be any of a variety of purchased media, such as audio and/or video, ringtones, or executable software. At 208, the downloaded content is stored as a media file in memory of the device implementing the method 200. The storing of the media as a media file can controlled by a file creation engine, such as described herein.

At 210, the memory of the device is queried for the media file based on at least one condition associated with the connection of the network interface component to the external source through the secure network connection. The at least one condition can include a file creation timestamp of the media file, which is compared relative to a start and/or end time of the secure network connection. Alternatively or additionally, the at least one condition can include an indication (e.g., provided by a monitor process running in the device) that a file is created during a secure network connection. The information regarding the at least one condition, such as the start and/or end times of the secure network connection, can be provided from any of a plurality of network layers, such as an OS abstraction layer or a network driver.

At 212, a media profile log comprising information relevant to purchased media with information associated with the media file is updated in the computer device implementing the method 200. The media profile log can be appended to include information regarding the file names, file sizes, source IP addresses, file creation, metadata and download and/or access timestamps. Therefore, the media profile log is resident on the computer device, such that the computer device can provide network profile updates and/or push requests to an external server. Alternatively or additionally, the device can make the profile log available to a service provider, which can poll the device for the profile log.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A computing device comprising:
a network interface configured to invoke a secure network connection and to download media content via the secure network connection;
a memory that stores program instructions, a media profile log, and the downloaded media content; and
a processor configured to execute the program instructions stored in the memory to cause the computing device to:
detect the invocation of the secure network connection over which the media content is to be downloaded, the downloading of the media content being enabled as a result of the download condition being detected;
determine a start time and an end time for the secure network connection;
after conclusion of the secure network connection, query the memory to identify the downloaded media content as having been downloaded over the secure network connection based on a query condition that is based on the start time, the end time, and a creation time of the downloaded media content at the computing device;
after identifying the downloaded media content, analyze the downloaded media content to identify at least one property of the downloaded media content;
update the media profile log to include the at least one identified property of the downloaded media content, the at least one identified property including one or more of an address of an external source from where the downloaded media content was downloaded, a file name of the downloaded media content, a file extension of the downloaded media content, a file size associated with the downloaded media content, an access time associated with the downloaded media content, and metadata of the downloaded media content;
send the media profile log from the computing device to an external device as a push request using the network interface; and receive information from the external device in response to the push request, the received information being based upon the media profile log.

2. The computing device of claim 1, wherein establishing the secure network connection is responsive to the processor executing the program instructions to instantiate a Secure Sockets Layer (SSL) via the network interface.

3. The computing device of claim 1, wherein the at least one identified property of the downloaded media content includes two or more identified properties of the downloaded media content, the two or more identified properties including at least two of the address of the external source from where the downloaded media content was downloaded, the file name of the downloaded media content, the file extension of the downloaded media content, the file size associated with the downloaded media content, the access time associated with the downloaded media content, and the metadata of the downloaded media content.

4. The computing device of claim 1, wherein the execution of the program instructions by the processor further causes the computing device periodically scan the downloaded media content for access times associated therewith and to update access times associated with the downloaded media content in the media profile log.

5. The computing device of claim 1, wherein the received information from the external device in response to the push request includes an advertisement based at least partially on information contained in the media profile log.

6. The computing device of claim 1, wherein the computing device comprises a portable electronic device.

7. The computing device of claim 1, wherein the network interface includes a wireless network interface.

8. The computing device of claim 1, wherein the downloaded media content comprises audio content, video content, or executable software.

9. A computing device comprising:
a memory to store program instructions, a media profile log, and downloaded media content;
a network interface;
a processor configured to execute the program instructions stored in the memory to cause the computing device to:

detect the invocation of a secure network connection using the network interface over which the media content is downloaded to the memory, the downloading of the media content to the memory being enabled as a result of the download condition being detected;

determine a start time and an end time of the secure network connection;

after conclusion of the secure network connection, query the memory based on the start time, the end time, and a creation time of the downloaded media content to identify the downloaded media content as having been downloaded over the secure network connection;

after identifying the downloaded media content, analyze the downloaded media content to identify at least two properties of the downloaded media content;

update the media profile log to include the at least two identified properties of the downloaded media content, the at least two identified properties including an address of an external source from where the downloaded media content originated and at least one of a file name of the downloaded media content, a file extension of the downloaded media content, a file size associated with the downloaded media content, an access time associated with the downloaded media content, and metadata of the downloaded media content; and send the media profile log from the computing device to the external source to to inform the external source whether the downloaded media content was purchased by a user of the computing device or illegally redistributed.

10. The computing device of claim 9, wherein the computing device comprises a portable electronic device.

11. The computing device of claim 9, wherein the downloaded media content comprises audio content, video content, or executable software.

* * * * *